(12) United States Patent
Wing et al.

(10) Patent No.: US 11,063,903 B2
(45) Date of Patent: Jul. 13, 2021

(54) PORT AND LOOPBACK IP ADDRESSES ALLOCATION SCHEME FOR FULL-MESH COMMUNICATIONS WITH TRANSPARENT TLS TUNNELS

(71) Applicant: VMWARE, INC., Palo Alto, CA (US)

(72) Inventors: Daniel G. Wing, Truckee, CA (US); Dexiang Wang, Sunnyvale, CA (US); Nidheesh Dubey, Union City, CA (US)

(73) Assignee: VMware, Inc., Palo Alto, CA (US)

( * ) Notice: Subject to any disclaimer, the term of this patent is extended or adjusted under 35 U.S.C. 154(b) by 32 days.

(21) Appl. No.: 15/950,983

(22) Filed: Apr. 11, 2018

(65) Prior Publication Data
US 2019/0319918 A1 Oct. 17, 2019

(51) Int. Cl.
| | | |
|---|---|---|
| H04L 29/12 | (2006.01) | |
| H04L 29/06 | (2006.01) | |
| H04L 9/08 | (2006.01) | |
| G06F 9/455 | (2018.01) | |
| H04L 29/08 | (2006.01) | |
| H04L 12/46 | (2006.01) | |

(52) U.S. Cl.
CPC ........ *H04L 61/256* (2013.01); *G06F 9/45558* (2013.01); *H04L 9/0861* (2013.01); *H04L 12/4633* (2013.01); *H04L 61/2557* (2013.01); *H04L 61/2592* (2013.01); *H04L 63/029* (2013.01); *H04L 63/0428* (2013.01); *H04L 63/061* (2013.01); *H04L 67/2814* (2013.01); *G06F 2009/45595* (2013.01)

(58) Field of Classification Search
CPC ............. H04L 12/4633; H04L 61/2592; H04L 63/029; H04L 61/256; H04L 61/2557
See application file for complete search history.

(56) References Cited

U.S. PATENT DOCUMENTS

2004/0258056 A1* 12/2004 Ishihara .............. H04L 12/4633
370/386
2006/0104288 A1* 5/2006 Yim ........................ H04L 69/16
370/395.52

(Continued)

OTHER PUBLICATIONS

Redhat, "4.8. Using Stunnel", https://access.redhat.com/documentation/en-us/red_hat_enterprise_linux/7/html/security_guide/sec-using_stunnel, last viewed on Apr. 9, 2018, 5 pages.

(Continued)

*Primary Examiner* — Jeong S Park

(57) ABSTRACT

The method for a virtual machine to use a port and loopback IP addresses allocation scheme for full-mesh communications with transparent transport layer security tunnels is presented. In an embodiment, the method comprises detecting, at a redirect agent implemented in a first machine, a packet that is sent from a client application executing on the first machine toward a server application executing on a second machine; and determining, by the redirect agent, whether a first redirect rule matches the packet. In response to determining that the first redirect rule matches the packet, the redirect agent applies the first redirect rule to the packet to translate the packet into a translated packet, and provides the translated packet to a client agent implemented in the first machine to cause the client agent to transmit the translated packet to a server agent implemented in the second machine.

20 Claims, 11 Drawing Sheets

(56) References Cited

U.S. PATENT DOCUMENTS

| | | | |
|---|---|---|---|
| 2011/0119331 A1 | 5/2011 | Zhang | |
| 2012/0265976 A1* | 10/2012 | Spiers | G06F 9/45533 713/2 |
| 2013/0128891 A1* | 5/2013 | Koponen | H04L 45/74 370/392 |
| 2014/0325637 A1* | 10/2014 | Zhang | H04L 61/2535 726/15 |
| 2017/0034051 A1* | 2/2017 | Chanda | H04L 12/4633 |
| 2017/0099188 A1* | 4/2017 | Chang | H04L 63/20 |
| 2017/0170987 A1* | 6/2017 | Kumar | H04L 69/22 |
| 2018/0046559 A1* | 2/2018 | Shimokuni | G06F 11/0778 |
| 2018/0069924 A1* | 3/2018 | Tumuluru | H04L 49/70 |
| 2019/0230125 A1* | 7/2019 | Lee | H04L 63/164 |

OTHER PUBLICATIONS

Krauze, Joseph, "Encryption Via a Proxy", https://www.ezesoft.com/insights/stunnel-enabling-fix-encryption-proxy. Dated Aug. 15, 2017, 9 pages.

Iptables—Redirecting from outgoing loopback traffic—is it possible? ,https://stackoverflow.com/questions/26945213/iptables-redirecting-from-outgoing-loopback-traffic-is-it-possible, Apr. 9, 2018, 3pgs.

Creating Encrypted Connections with Stunnel, http://docs.testplant.com/?q=creating-encrypted-connections-with-stunnel, last viewed on Apr. 9, 2018, 2 pages.

\* cited by examiner

PORT AND LOOPBACK IP ADDRESSES ALLOCATION SCHEME FOR FULL-MESH COMMUNICATIONS WITH TRANSPARENT TLS TUNNELS

BACKGROUND

Various rules and regulations impose encryption requirements on TCP-based communications exchanged between virtual machines. Data encryption functionalities may be provided by some communications protocols that are used to manage communications exchanged between the virtual machines. One of such protocols is a transport layer security (TLS) cryptographic protocol.

Although TLS provides a broad range of encryption functionalities, the configuration and operational complexity of TLS places a significant burden on the software developers. In some situations, configuring TLS could be delegated to a network layer by requiring the network layer to support the establishing of a full-mesh of TLS secure communications connections between software applications executing on the virtual machines.

However, to function properly, a full-mesh TLS service needs to satisfy certain requirements. First, a TLS service needs to support establishing secure communications connections between any two virtual machines of a plurality of virtual machines. That means that the TLS service needs to be configured to allow any virtual machine to communicate with any other virtual machine via a separate TLS tunnel. Furthermore, any server application should be able to acknowledge TLS connection requests from any client application, and should be able to distinguish between the separate TLS tunnels.

Second, a full-mesh TLS service needs to be transparent to clients and servers. The transparency in this context means that the full-mesh TLS service should allow a client application and a server application to continue using their respective original source and destination addresses to communicate with each other, and the client and server applications should remain unaware of any internal address translations performed on the original addresses.

Implementing a TLS service that meets the full-mesh and transparency requirements is usually difficult. For example, in the Linux operating system, an IP_TRANSPARENT socket option may be used to bind a client application to a server application and to save the client-side NAT filters; however, implementing the IP_TRANSPARENT option usually requires providing routing support and superuser privileges and that may be impossible in some situations. In other operating systems, such as Windows, a socket option is not available.

SUMMARY

Techniques are described herein for defining and using a port and loopback IP addresses allocation scheme for providing a full-mesh of secure communications connections within transparent TLS tunnels, referred to herein as TTT.

A TTT may be provided by a proxy designed to provide the TLS encryption functionalities to client virtual machines and server virtual machines without requiring any changes to program codes of the software applications executing on the clients and the servers. In some embodiments, the open source project, "stunnel" by Michał Trojnara can be used to implement this functionality. The TTT may be used to provide mechanisms for establishing secure encrypted connections between the clients and servers when the clients and servers themselves do not implement the TLS functionalities.

In an embodiment, a port and loopback IP addresses allocation scheme uses a spare port implemented in a virtual machine on which a client application is executed. The spare port is referred herein to as a redirect port. The scheme also uses a tunnel port implemented on a virtual machine on which a server application is executed. The ports are described in detail later.

The scheme may also use two loopback IP addresses of a virtual machine on which a server application is executed. The redirect port, the tunnel port, and the loopback IP addresses are used to facilitate redirecting communications exchanged between the client application and the server application in such a way that the communications are being encrypted when exchanged between the corresponding virtual machines even though the client and server applications themselves are not involved in the encrypting.

In an embodiment, the full-mesh capabilities include the capability to establish the connectivity between a client virtual machine and a server virtual machine. The client and server virtual machines may be arbitrarily selected from a potentially large set of virtual machines. The set may include for example, 1000 or more of virtual machines.

The simple example provided in this section describes two virtual machines, and describes establishing a secure communications tunnel between the two machines. It should be noted that a full-mesh may be built by expanding the simple two-virtual-machine-example provided in this section, to a full-mesh of connections connecting hundreds or thousands of virtual machines.

Suppose that a virtual machine that hosts a particular client application that attempts to communicate, or communicates, with a particular server application is denoted herein as a virtual machine 1 (VM1), while a virtual machine that hosts the particular server application is denoted as a virtual machine 3 (VM3). Generally, the VM1 may host one or more client applications and one or more server applications, and the VM3 may host one or more other client applications and one or more other server applications. Therefore, the VM1 and VM3 may support a full-mesh between the respective client applications and the respective server applications. Although the example herein describes two virtual machines, the full-mesh concept may be implemented to hundreds or thousands of virtual machines.

In an embodiment, a scheme for providing a full-mesh of secure communications connections uses network address translation (NAT) agents and distributed network encryption (DNE)-TLS agents. The NAT agents may include NAT redirect agents and NAT restore agents, and each of the VM1 and VM3 may host own NAT redirect agents and own NAT restore agents. A NAT redirect agent and a NAT restore agent hosted on a virtual machine may, or may not, coexist in the same NAT agent.

The VM1 may host a NAT redirect agent configured to translate headers of packets that a client application executing on the VM1 transmits toward a server application executing on the VM3, and host a NAT restore agent configured to translate headers of packets that are to be provided to the client application executing on the VM1. Furthermore, the VM3 may host a NAT restore agent configured to translate headers of packets that are to be provided to the server application executing on the VM3, and host a NAT redirect agent configured to translate headers of packets that the server application executing on the VM3 transmits toward the client application executing on the VM1.

To implement the TTT functionality in a cloud, DNE-TLS agents may be deployed on each virtual machine. Each DNE-TLS agent may have two functional components, a DNE-TLS client and a DNE-TLS server. The two components may, or may not, coexist in the same DNE-TLS agent.

DNE-TLS agents may include DNE-TLS client agents and DNE-TLS server agents, and each of the VM1 and VM3 may host own DNE-TLS client agents and own DNE-TLS server agents. The DNE-TLS agents may be configured to for example, establish a communications connection between a client application executing on the VM1 and a server application executing on the VM3. This may include establishing three separate communications connections that collectively form a virtual communications connection between the client application and the server application. The three separate communications connections may include 1) a communications connection between the client application executing on the VM1 and the DNE-TLS client agent implemented in the VM1, 2) a secure TTT communications connection between a DNE-TLS client agent implemented in the VM1 and a DNE-TLS server agent implemented in the VM3, and 3) a communications connection between the DNE-TLS server agent implemented in the VM3 and the server application executing on the VM3. The DNE-TLS agents may also be configured to facilitate data encryption of packets exchanged between the DNE-TLS agents along the secure TTT communications connection. An example process of establishing the connections is described in FIG. 2A. It should be noted that before real data can be encrypted and transmitted between DNE-TLS client agent and DNE-TLS server agent, a TTT handshake process is executed by the DNE-TLS client agent and the DNE-TLS server agent, to authenticate the agents and to negotiate the encryption algorithm/secrets such as encryption keys.

Suppose that a client application is executing on the VM1 and a server application is executing on the VM3. Then, the VM1 may host a NAT redirect agent, a DNE-TLS client agent, and a NAT restore agent; while the VM3 may host a DNE-TLS server agent, a NAT restore agent and a NAT redirect agent. The NAT redirect agent implemented in the VM1 may be configured to intercept a packet that the client application transmits toward the server application, translate a header of the packet so that the packet is redirected to the DNE-TLS client agent implemented in the VM1, and provide the translated packet to the DNE-TLS client agent.

If the translated packet is a request sent by the client application to establish a communications connection with the server application, then the DNE-TLS client agent implemented in the VM1 may cooperate with the DNE-TLS server agent implemented in the VM3 to establish the connection.

If the translated packet is a data packet that the client application transmitted toward the server application, then the NAT redirect agent implemented in the VM1 may intercept the data packet, and translate a header of the packet to facilitate redirecting the packet to the DNE-TLS client agent implemented in the VM1. The purpose of redirecting the packet to the DNE-TLS client agent (and not sending the packet directly to the server application executing on the VM3) is to allow the DNE-TLS client agent to encrypt the packet, and transmit the encrypted data packet from VM1 to the DNE-TLS server agent implemented in the VM3. The redirecting may include replacing, in the header of the packet, a destination IP address of the VM3 with an IP address of the VM1, and replacing, in a header of the packet, a destination port identifier with an identifier of a redirect, local port on the VM1.

Upon detecting the data packet, the DNE-TLS client agent may encrypt the data packet, and transmit the encrypted data packet, via the secure TTT connection, to the DNE-TLS server agent implemented in the VM3.

Upon receiving the encrypted data packet, the DNE-TLS server agent may decrypt the encrypted data packet, and provide the decrypted data packet to the NAT restore agent implemented in the VM3. The NAT restore agent may intercept the decrypted data packet that was intended to the server application executed on the VM3, and translate a header of the decrypted data packet to restore the header of the data packet. The purpose of restoring the header of the data packet is to overwrite, in the header of the data packet, a source IP address (corresponding to one of the loopback IP addresses of the VM3) with an actual source IP address of the VM1, and to overwrite, in the header of the data packet, a destination IP address (corresponding to another loopback IP address of the VM3) with an actual destination IP address of the VM3. The restored data packet is delivered to the server application executing on the VM3. An example process of redirecting and restoring packets transmitted from the client application executing on the VM1 toward the server application executing on the VM3 is described in FIG. 3A.

Upon receiving the restored data packet, the server application executing on the VM3 may generate a response data packet, and transmit the response data packet toward the client application executing on the VM1. The response data packet may be intercepted by the NAT redirect agent implemented in the VM3, and redirected to the DNE-TLS server agent implemented in the VM3. The redirecting may include replacing, in a header of the data packet, a source IP address with one of the loopback IP addresses of the VM3, and replacing, in the header of the data packet, a destination IP address with another loopback IP address of the VM3.

Upon receiving the redirected response data packet, the DNE-TLS server agent encrypts the response data packet, and transmits the encrypted response data packet, via the secure TTT connection, to the DNE-TLS client agent implemented in the VM1.

Upon receiving the encrypted response data packet, the DNE-TLS client agent decrypts the encrypted response data packet, and provides the decrypted response data packet to the NAT restore agent implemented in the VM1. Upon detecting the decrypted response data packet, the NAT restore agent restores the decrypted response data packet, and provides the restored response data packet to the client application executing on the VM1. The purpose of restoring the response data packet is to ensure that the data packet looks like it comes from the VM3. The restoring may include replacing, in a header of the packet, a source IP address with an IP address of the VM3, and replacing, in the header of the packet, an identifier of the redirect local port of the VM1 with an identifier of the actual port on which the server application, implemented in the VM3, listens. An example process of redirecting and restoring packets transmitted from the server application executing on the VM3 toward the client application executing on the VM1 is described in FIG. 4A.

In an embodiment, an approach provides encryption mechanisms for communicating data packets between a client application executed on one virtual machine and a server application executed on another virtual machine. The encryption mechanisms are implemented in DNE-TLS agents to establish and utilize a secure TTT tunnel. The secure TTT tunnel is transparent to both the client application and the server application even though both the client application and the server application benefit from the provided security mechanisms. The described process imposes no requirements on either the client application or the server application. The security mechanisms are provided by the DNE-TLS agents and by utilizing spare ports and loopback IP addresses implemented in the virtual machines.

In an embodiment, an approach provides security mechanisms for exchanging communications between client applications and server applications that are executed under various operating systems, including the Windows operating system. In the Windows-based implementations, a DNE-TLS client agent implemented in one virtual machine may establish a secure TTT communications connection (including for example, an HTTPS connection) with a DNE-TLS server agent implemented in another virtual machine. It should be noted that HTTPS is "HTTP within TLS (or SSL)." The traffic carried in compliance with TLS does not need to be HTTP traffic. DNE-TLS can be also used for communicating other types of traffic.

A secure communications connection may be used by the Windows client application and the Windows server application to securely communicate with each other without imposing any encryption requirements on the client application and the server applications themselves. The approach may be also implemented to provide security mechanisms in other operating systems.

DETAILED DESCRIPTION

Figure 1:
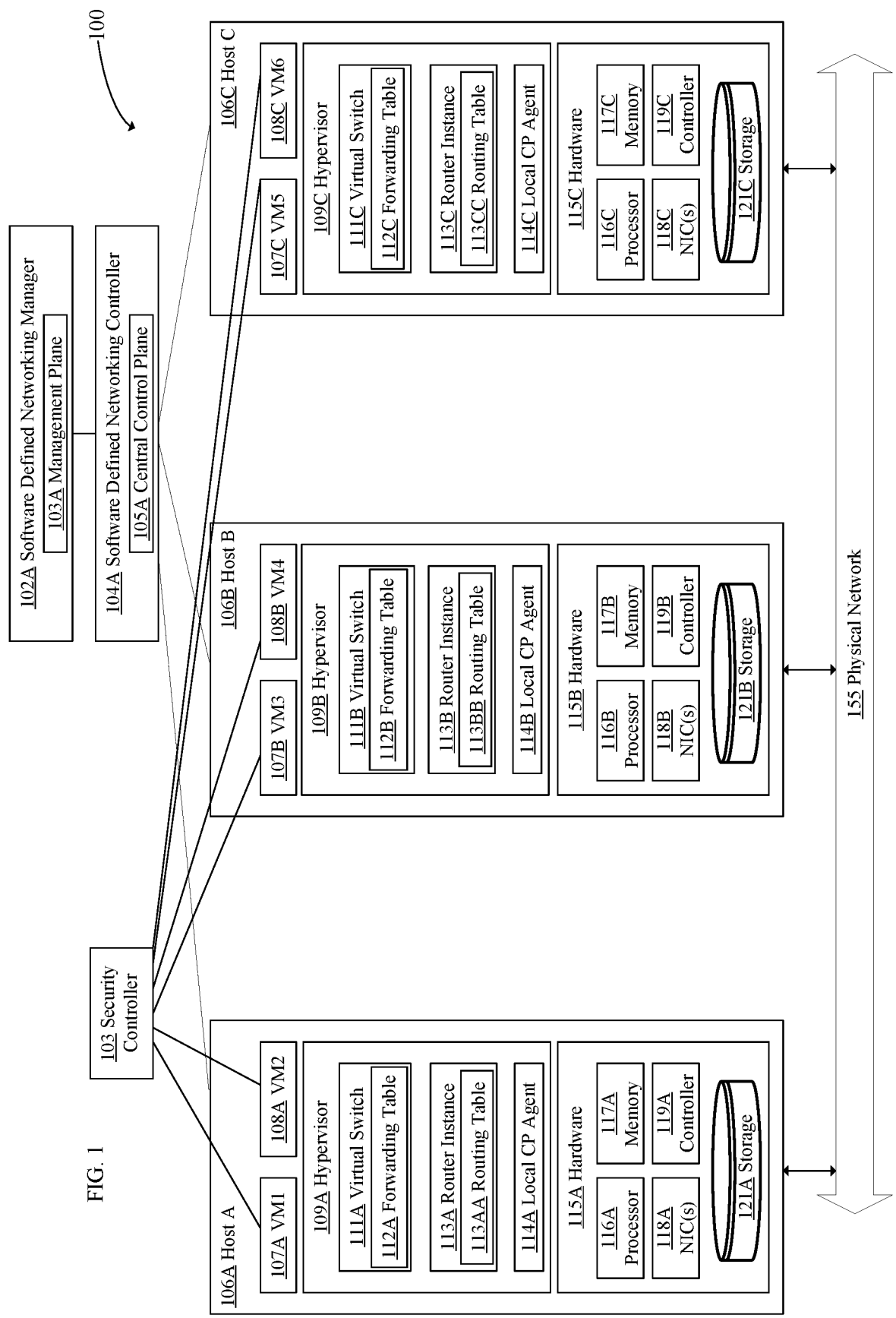
FIG. 1 is a block diagram depicting an example physical implementation view of an example logical network environment for implementing a port and loopback IP addresses scheme for full-mesh communications with transparent TLS tunnels.

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. Overview

In an embodiment, an approach for a port and loopback IP addresses allocation scheme for full-mesh communications uses NAT agents and DNE-TLS agents. The NAT agents may include NAT redirect agents and NAT restore agents. NAT redirect agents are software programs configured to redirect packets from client/server applications to DNE-TLS agents. NAT restore agents are software programs configured to restore packets received from the DNE-TLS agents and providing the restored packets to the client/server applications.

DNE-TLS agents may include DNE-TLS client agents and DNE-TLS server agents. DNE-TLS client agents are software programs configured to cooperate with DNE-TLS server agents to establish communications connections between a client application and a server application, encrypt data packets detected by the DNE-TLS client agents, and transmit the encrypted packets to the DNE-TLS server agents. DNE-TLS server agents are software programs configured to cooperate with the DNE-TLS client agents to establish the communications connections, and decrypt the encrypted data packet detected by the DNE-TLS server agents.

In one embodiment, a virtual machine that hosts a client application implements a NAT redirect agent, a DNE-TLS client agent, and a NAT restore agent that are dedicated to implement the approach for the client application, while a virtual machine that hosts a server application implements a DNE-TLS server agent, a NAT restore agent, and a NAT restore agent that are dedicated to implement the approach for the server application.

For a given application executing on a virtual machine, both a NAT redirect agent and a NAT restore agent may be implemented in one agent application executing on the virtual machine. Alternatively, a NAT redirect agent and a NAT restore agent may be implemented in separate NAT agent applications executing on the virtual machine.

A virtual machine may implement a DNE-TLS client agent for a client application executing on a client virtual machine, and implements a DNE-TLS server agent for a server application executing on a server virtual machine. Both the DNE-TLS client agent and the DNE-TLS server agent may be implemented in one agent application executing on the virtual machine. Alternatively, the DNE-TLS client agent and the DNE-TLS server agent may be implemented in separate DNE-TLS agent applications executing on the virtual machine.

In an embodiment, a client virtual machine that hosts a client application that attempts to communicate, or communicates, with a server application executing on another virtual machine implements a NAT redirect agent, a DNS-TLS client agent, and a NAT restore agent. A server virtual machine that hosts a server application with which a client application executed on another virtual machine attempts to communicate, or communicates, implements a DNS-TLS server agent, a NAT restore agent, and a NAT redirect agent. The agents implemented in the virtual machines may be implemented as separate NAT agents and separate DNE- TLS agents. Alternatively, the functionalities of the agents may be implemented in an omni-agent application.

As described above, merely to provide clear examples the following notation is used: a client virtual machine that hosts a client application that attempts to communicate, or communicates, with a server application is denoted as a VM1, while a server virtual machine that hosts the server application is denoted as a VM3.

2. Example Physical Implementation View of An Example Logical Network Environment of a Multisite Datacenter FIG. 1 is a block diagram depicting an example physical implementation view of an example logical network environment 100 for implementing a port and loopback IP addresses scheme for full-mesh communications with TTTs. In the depicted example, environment 100 includes a security controller 103, a software defined networking (SDN) manager 102A, an SDN controller 104, one or more hosts 106A, 106B, 106C, and one or more physical networks 155.

Security controller 103 may be a software application configured to communicate with virtual machines hosted on hosts 106A/106B/106C, and configured to provide NAT address translation rules to the virtual machines. The NAT address translation rules may be configured on security controller 103 by a system administrator or by SDN manager 102A. The NAT address translation rules may be used by NAT redirect agents and NAT restore agents implemented in the virtual machines to perform NAT translations of headers of packets detected by the NAT redirect agents and the NAT restore agents.

A NAT address translation rule may provide for example, instructions to a NAT redirect agent executing on a particular virtual machine to replace, in a header of a detected packet, a destination IP address with an IP address of a client application, and to replace, in the header, a destination port identifier with an identifier of a redirect port implemented in the particular virtual machine. Examples of the NAT address translation rules are described below with reference to FIG. 3B-3C and FIG. 4B-4C. Examples of using the NAT address translation rules to translate network addresses by the NAT redirect agents and the NAT restore agents are described below with reference to FIGS. 3A and 4A.

FIG. 1 is an example environment that includes a software defined datacenter. It should be noted, however, that the invention can be implemented by any two endpoints, which may be virtual machines or physical computing devices, that are in communication with each other and in communication with security controller 103. In this example, SDN manager 102A may be configured to distribute various rules and policies to management plane agents, and receive update information from the agents. SDN manager 102A may use a management plane 103A to distribute and update the rules and policies. SDN manager 102A may also collect information about events, actions and tasks occurring or executed on hosts 106A, 106B, 106C, and use the collected information to update management plane 103A.

SDN controller 104A may be configured to receive rules and polices from SDN manager 102A, and control implementation of the rules and policies in hosts 106A, 106B, 106C. SDN controller 104A may use a central control plane 105A to control implementation of the rules and policies.

Hosts 106A, 106B, 106C are used to implement logical routers, logical switches and virtual machines executing in architecture 100. Hosts 106A, 106B, 106C are also referred to as computing devices, host computers, host devices, physical servers, server systems or physical machines. Each host may be configured to support several virtual machines. In the example depicted in FIG. 1, host 106A is configured to support one or more virtual machines VM1 107A, and VM2 108A, hypervisor 109A, and hardware component 115A such as one or more processors 116A, one or more memory units 117A, one or more network interface controllers (NICs) 118A, one or more controllers 119A, and one or more storage devices 121A.

Hypervisors 109A/109B/109C are software layers or components that support the execution of multiple virtual machines. Hypervisors 109A/109B/109C may maintain mappings between underlying hardware 115A, 115B, 115C, respectively, and virtual resources allocated to the respective virtual machines.

Hypervisors 109A/109B/109C may be configured to implement virtual switches 111A/111B/111C, respectively. Hypervisors 109A/109B/109C may also be configured to implement forwarding tables 112A/112B/112C, respectively.

Logical switches, also referred to as "overlay network switches" or "software defined switches" may be implemented in a distributed manner and can span multiple hosts 106A/106B/106C. For example, to connect VM1 and VM3 to a logical switch, entries (not shown) may be added to forwarding table 112A of logical switch of virtual switch 111A and to forwarding table 112B of logical switch of virtual switch 112B that adds VM1 107A and VM3 107B to the logical switch. Traffic passing between VM1 and VM3 via the logical switch may be tunneled between host A 106A and host B 106B by tunnel endpoints, such as VXLAN or Geneve tunnel endpoints (not shown).

Virtual machines VM1-VM6 are executed on hosts 106A, 106B, 106C, respectively, and are merely examples of virtualized computing instances or workloads. A virtualized computing instance may represent an addressable data compute node or an isolated user space instance.

Hardware 115A/115B/115C may include appropriate physical components, such as processors 116A/116B/116C, memory units 117A/117B/117C, NICs 118A/118B/118C, physical network interface controllers 119A/119B/119C, and one or more storage devices 121A/121B/121C, respectively.

Figure 2A:
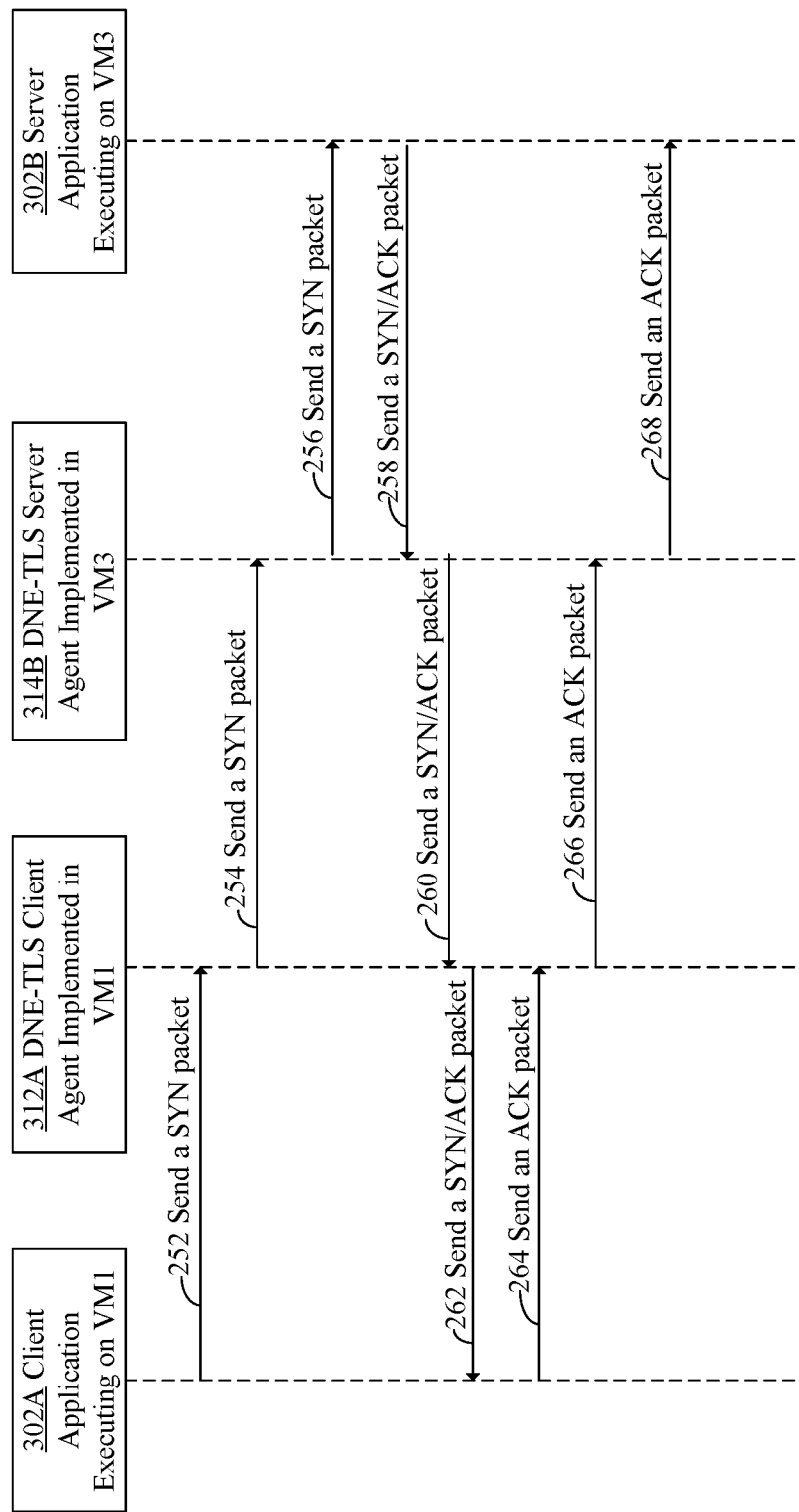
FIG. 2A is a block diagram depicting establishing a communications connection between a client application executing on one virtual machine and a server application executing on another virtual machine.
Figure 2B:
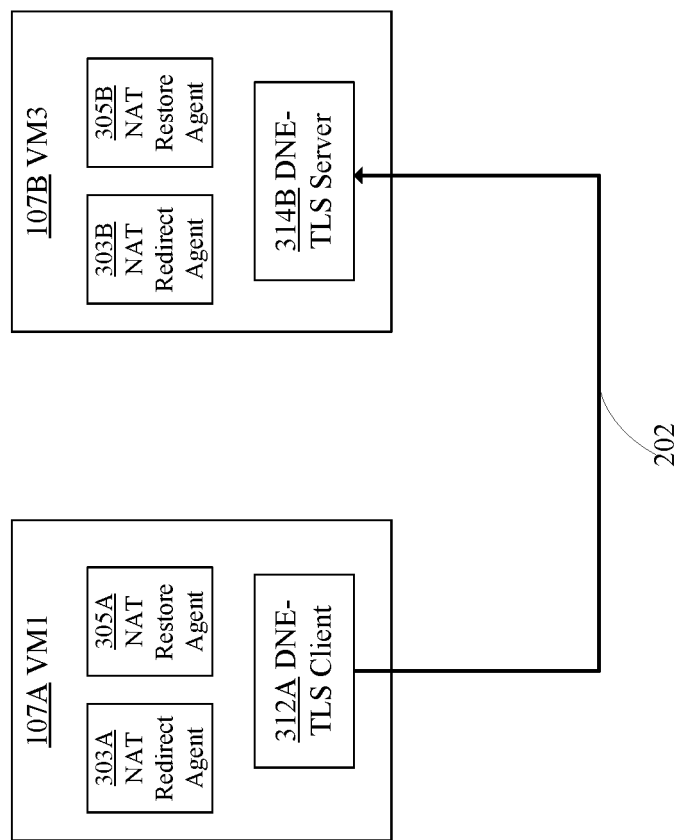
FIG. 2B is a block diagram depicting establishing a secure TLS communications connection between a DNE-TLS client agent implemented in one virtual machine and a DNE-TLS server agent implemented in another virtual machine.

3. Establishing a Communications Connection Between a Client Application and a Server Application FIGS. 2A and 2B are a block diagrams depicting establishing a communications connection between a client application executing on one virtual machine and a server application executing on another virtual machine. In the depicted example, a client application 302A is executed on VM1, and a server application 302B is executed on VM3. In addition to hosting client application 302A, VM1 also hosts a DNE-TLS client agent 312A. In addition to hosting server application 302B, VM3 also hosts a DNE-TLS server agent 314B. VM1 is referred to herein as VM1 client. VM3 is referred to herein as VM3 server.

Suppose that client application 302A executing on VM1 generates and issues a request to establish a TCP connection with server application 302B executing on VM3. Issuing the request to establish the TCP connection between client application 302A executing on VM1 and server application 302B executing on VM3 will result in establishing three communications connections: 1) an unsecure TCP connection between client application 302A executing on VM1 and DNE-TLS client agent 312A executing on VM1, 2) a secure TTT connection between DNE-TLS client agent 312A executing on VM1 and DNE-TLS server agent 314B executing on VM3, and 3) an unsecure TCP connection between DNE-TLS server agent 314B executing on VM3 and server application 302B executing on VM3.

In the example depicted in FIG. 2A, client application 302A sends (252) a SYN packet toward server application 302B. However, the SYN packet is intercepted by a NAT redirect agent 303A (FIG. 2B) implemented in VM1, and redirected to DNE-TLS client agent 312A.

Upon receiving the SYN packet from the NAT redirect agent implemented in the VM1, DNE-TLS client agent 312A generates and sends (254) a SYN packet to DNE-TLS server agent 314B.

Upon receiving the SYN packet, DNE-TLS server agent 314B generates and sends (256) a SYN packet toward server application 302B.

In response to receiving the SYN packet, server application 302B generates and sends (258) a SYN/ACK packet toward client application 302A. However, the SYN/ACK packet is intercepted by a NAT redirect agent (303B) implemented in VM3, and redirected to DNE-TLS server agent 314B implemented in VM3.

Upon receiving the SYN/ACK packet, DNE-TLS server agent 314B generates and sends (260) a SYN/ACK packet to DNE-TLS client agent 312A.

Upon receiving the SYN/ACK packet from DNE-TLS server agent 314B, DNE-TLS client agent 312A generates and sends (262) a SYN/ACK packet toward client application 302A.

In response to receiving the SYN/ACK packet, client application 302A generates and sends (264) an ACK packet toward server application 314B. However, the ACK packet is intercepted by the NAT redirect agent (not depicted in FIG. 2A) implemented in VM1, and redirected to DNE-TLS client agent 312A.

Once DNE-TLS client agent 312A receives the ACK packet, a TCP communications connection between client application 302A and DNE-TLS client agent 312A is established. Furthermore, DNE-TLS client agent 312A generates and sends (266) an ACK packet to DNE-TLS server agent 314B.

Once DNE-TLS server agent 314B receives the ACK packet from DNE-TLS client agent 312A, a TCP communications connection between DNE-TLS client agent 312A and DNE-TLS server agent 314B is established. Furthermore, DNE-TLS server agent 314B generates and sends (268) an ACK packet toward server application 302B.

Once server application 302B receives the ACK packet, a TCP communications connection between DNE-TLs server application 314B and server application 302B is established. At this point, the three TCP communications connection are established.

Furthermore, the TCP connection between DNE-TLS client agent 312A and DNE-TLS server agent 314B is secured when the DNE-TLS agents exchange encryption keys among each other and use the encryption keys to encrypt the packets they exchange.

Referring to FIG. 2B, NAT redirect agent 303A may be configured to perform a NAT translation of any packet that client application 302A sends to server application 302B, including the SYN packet and SYN ACK packets described above. The NAT translation may include translating an original destination IP address and an original destination port included replacing, in a header of the packet, a destination IP address and port number the IP address of VM1 a redirect port implemented in VM1. Once the NAT redirect agent finishes performing the NAT translation of the packet, the translated packet is communicated to DNE-TLS client agent 312A, and DNE-TLS client agent 312A proceeds as described in FIG. 2A.

NAT restore agent 305A may be configured to perform a NAT translation of an ingress packets received from DNE-TLS client agent 312A, including the SYN/ACK packet described above. The NAT translation of the packet may include replacing, in a header of the packet, a source IP address of VM1 with an IP address of VM3. The NAT translation may also include replacing, in the header, an identifier of the redirect source port of VM1 with the original source port of VM1. Once the NAT redirect agent finishes performing the NAT translation on the SYN/ACK packet, the translated SYN/ACK packet is communicated to the client application executing on VM1, and the client application proceeds as described in FIG. 2A.

Figure 3A:
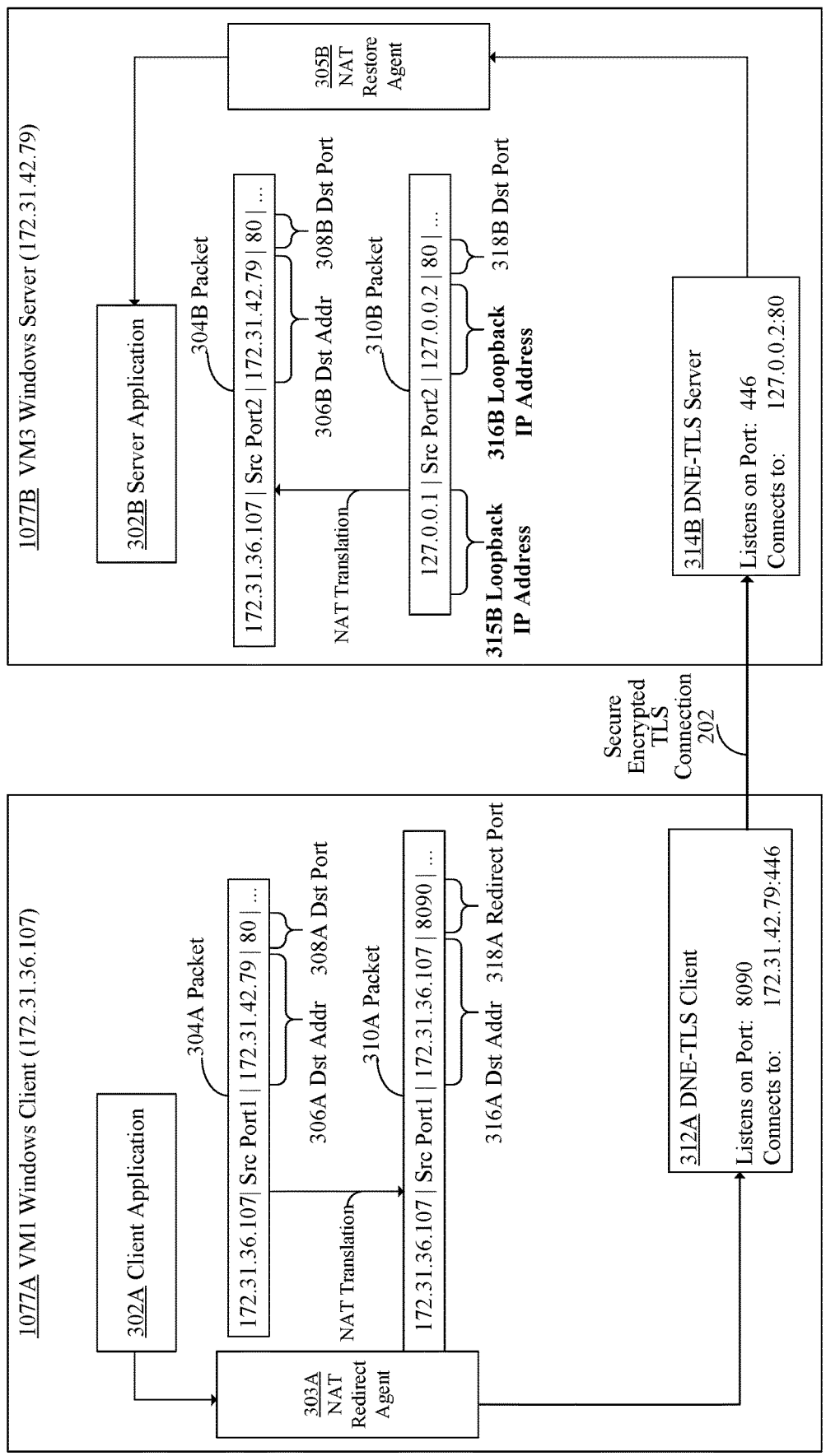
FIG. 3A is a block diagram depicting an example datapath traversed by a packet from a client application executing on one virtual machine to a server application executing on another virtual machine.

4. Example Translation of a Packet Sent from a Client Application to a Server Application FIG. 3A is a block diagram depicting an example datapath traversed by a packet from a client application 302A executing on VM1 to a server application 302B executing on VM3. Suppose that VM1 executes a Windows client 1077A that was assigned an IP address of 172.31.36.107. Suppose that VM3 executes a Windows server 1077B that was assigned an IP address of 172.31.42.79.

Furthermore, suppose that VM1 hosts a NAT redirect agent 303A, and a DNE-TLS client agent 312A. Moreover, suppose that VM3 hosts a DNE-TLS server agent 314B and a NAT restore agent 305B. Also, suppose that client application 302A generates and sends a SYN request to establish a communications connection with server application 302B. It should be noted that the address translation is performed in a similar fashion if the client application 302A sends a data packet.

In an embodiment, the SYN request is intercepted by NAT redirect agent 303A, which redirects the request to DNE-TLS client agent 312A. To do so, NAT redirect agent 303A may perform a NAT translation on the intercepted SYN packet, and cause redirecting the translated packet to DNE-TLS client agent 312A. The NAT translation may be performed on a header of a packet 304A by replacing, in the header, a destination IP address 306A of VM3 Windows server with an IP address 316A of the VM1 Windows client. This may also include replacing, in the header of packet 304A, a destination port identifier 308A with a redirect port identifier 318A of the redirect port implemented in VM1. The replacing process is described in detail in FIG. 3B. The resulting packet is referred to herein as a packet 316A.

Figure 3B:
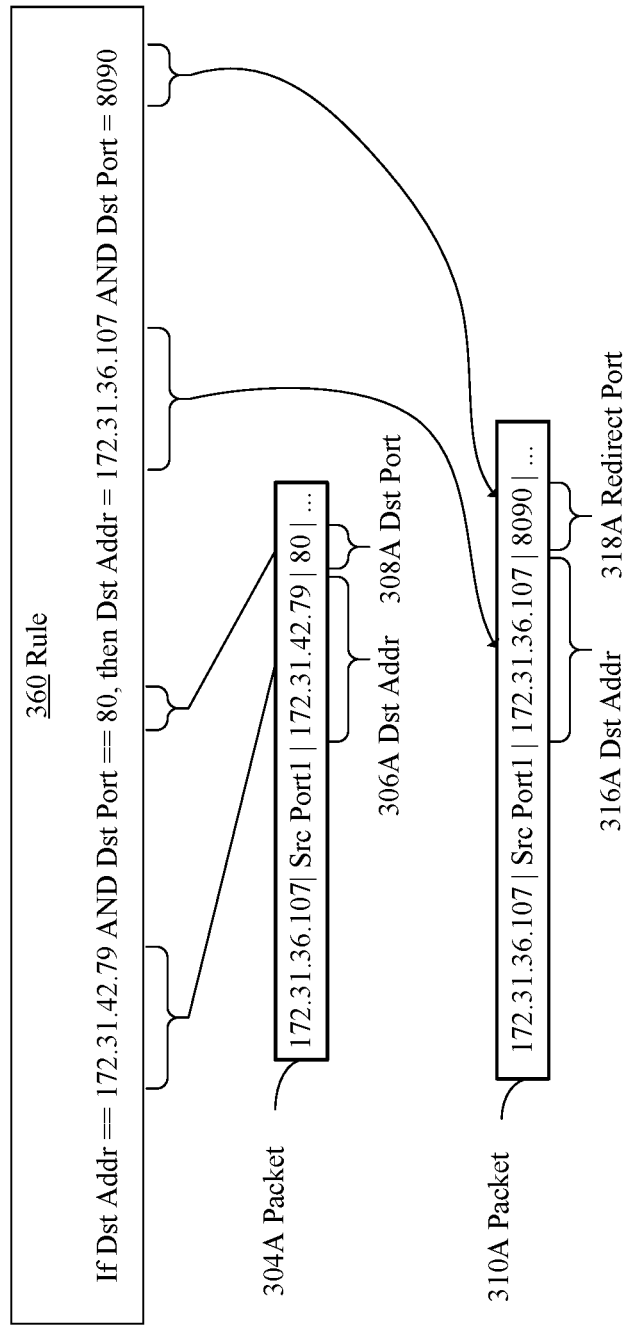
FIG. 3B is a block diagram depicting an example NAT translation performed by a NAT redirect agent.

FIG. 3B is a block diagram depicting an example NAT translation performed by NAT redirect agent 303A. The example NAT translation uses an example rule 360. Rule 360 provides that, in a header of data packet 304A, a destination IP address 306A of "172.31.42.79" is to be replaced with "172.31.42.79", which corresponds to the IP address of VM1 Windows client. Rule 360 also provides that, in the header of data packet 304A, a destination port identifier 308A of "80" is to be replaced with "8090", which corresponds to the identifier of the redirect port implemented in VM1.

Continuing with the example described in FIG. 3A, DNE-TLS client agent 312A detects packet 316A on port "8090", and determines that packet 316A corresponds to a SYN request. Therefore, DNE-TLS client agent 312A generates a SYN packet, and sends the SYN packet to DNE-TLS server agent 314B, which detects the packet on port "446."

DNE-TLS server agent 314B determines that the detected packet corresponds to a SYN request, and, therefore, generates a SYN packet 310B having a source IP address of a loopback IP address 315B of VM3, a destination IP address of a loopback IP address 316B of VM3, and a destination port "80", which corresponds to the port 308A in the original packet 304A.

In an embodiment, packet 310B is intercepted by NAT restore agent 305B, which restores packet 310B. To do so, NAT restore agent 305B may perform a NAT translation on the intercepted packet 310B, and cause redirecting the translated packet to server application 302B. The NAT translation may be performed on a header of packet 310B by replacing, in the header, a loopback IP address 315B with the source IP address of VM1 Windows client, and replacing a loopback IP address 316B with the destination IP address of VM3 Windows server. The replacing process is described in detail in FIG. 3C. The resulting packet is referred to herein as a packet 304B.

Figure 3C:
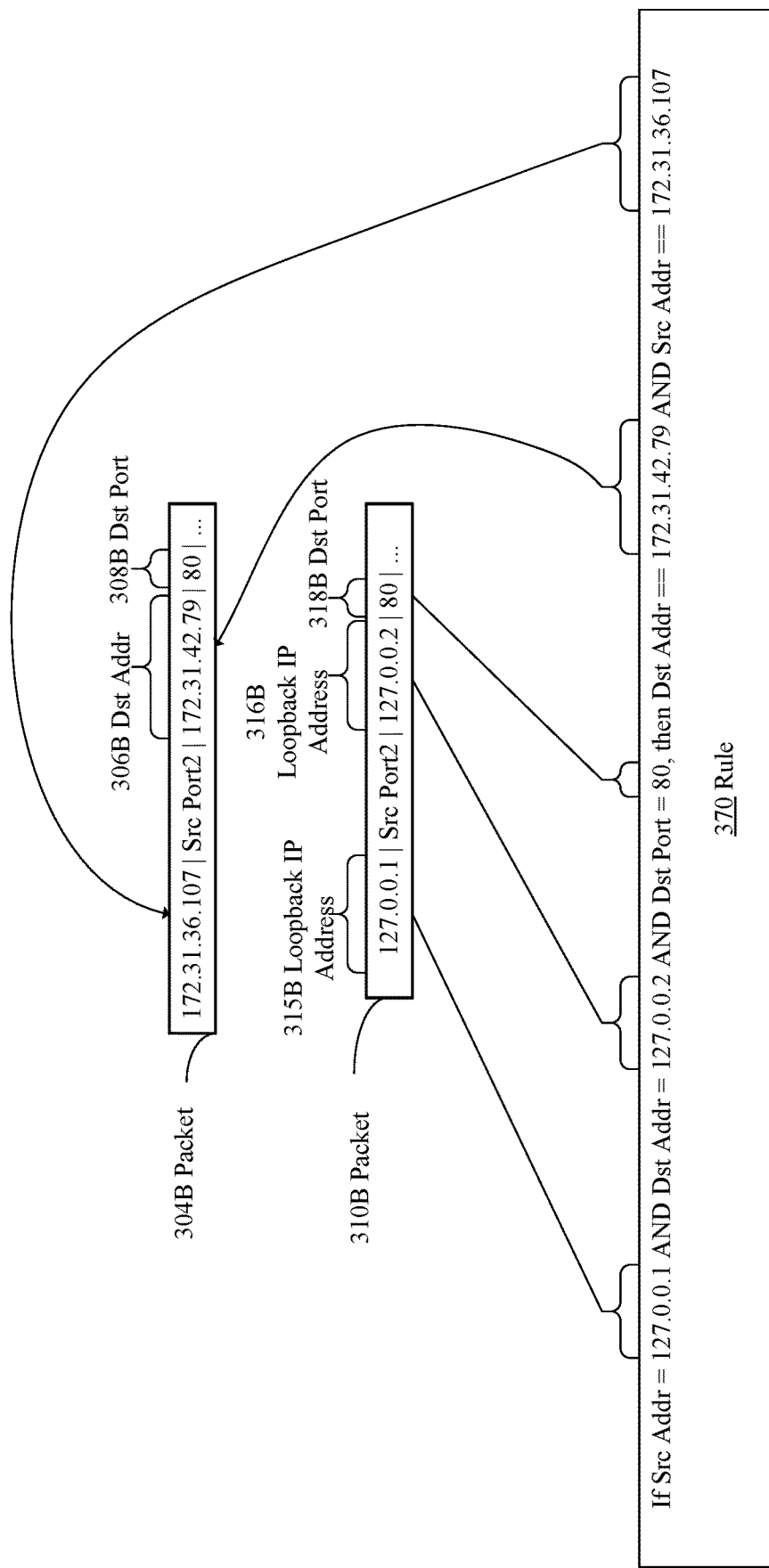
FIG. 3C is a block diagram depicting an example NAT translation performed by a NAT restore agent.

FIG. 3C is a block diagram depicting an example NAT translation performed by NAT restore agent 305B. The example NAT translation uses an example rule 370. Rule 370 provides that, in a header of data packet 310B, a loopback IP address 315B of "127.0.0.1" is to be replaced with the source IP address of "172.31.36.107" of VM1 Windows client, and a loopback IP address 316B of "127.0.0.2" is to be replaced with the destination IP address "172.31.42.79" of VM3 Windows server.

A resulting packet 304B is provided to server application 302B. Upon receiving data packet 304B, server application 302B generates a response.

Continuing with the example depicted in FIG. 3A, it is assumed that packet 304B includes the SYN packet sent by client application 302A. Therefore, in response to receiving the SYN packet, server application 302B may generate a SYN/ACK packet, as described in FIG. 2A, and the three-way handshake process may be continued as described in FIG. 2A.

However, if the three-way handshake process has been already successfully completed, and a TCP communications connection has been established between client application 302A and server application 302B, then packet 304A may be a data packet containing data that client application 302A sent to server application 302B. In this case, in response to receiving data packet 304A, server application 302B generates a response data packet and sends a response data packet to client application 302A.

Figure 4A:
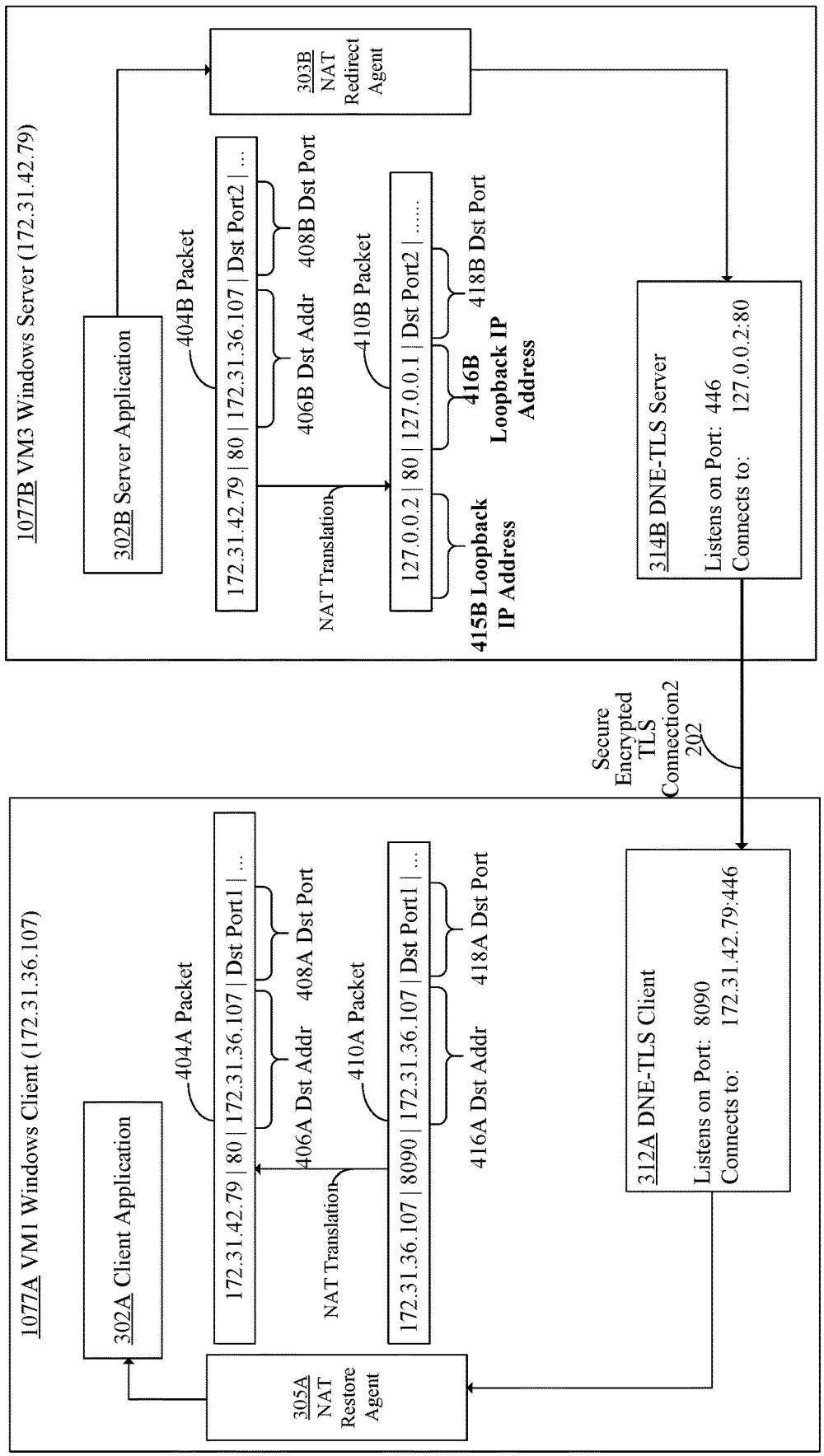
FIG. 4A is a block diagram depicting an example datapath traversed by a packet from a server application executing on one virtual machine to a client application executing on another virtual machine.

The process of sending either a SYN/ACK packet or a response data packet from server application 302B to client application 302A is described in FIG. 4A.

5. Example Translation of a Packet Sent from a Server Application to a Client Application FIG. 4A is a block diagram depicting an example datapath traversed by a packet from a server application 302B executing on VM3 to a client application 302A executing on VM1.

Suppose that VM1 executes a Windows client 1077A that was assigned an IP address of 172.31.36.107. Suppose that VM3 executes a Windows server 1077B that was assigned an IP address of 172.31.42.79.

Furthermore, suppose that VM1 hosts a DNE-TLS client agent 312A and a NAT restore agent 305A. Moreover, suppose that VM3 hosts a NAT redirect agent 303B, an a DNE-TLS server agent 314B. Also, suppose that server application 302B generates and sends a SYN/ACK request to client application 302A. It should be noted that the address translation is performed in a similar fashion if the server application 302B sends a response data packet.

In an embodiment, the SYN/ACK packet is intercepted by NAT redirect agent 303B, which redirects the packet to DNE-TLS server agent 314B. To do so, NAT redirect agent 303B may perform a NAT translation on the intercepted SYN/ACK packet, and cause redirecting the translated packet to DNE-TLS server agent 314B. For example, the NAT translation may be performed on a header of a packet 404B by replacing, in the header, a source IP address with a loopback IP address 415B of VM3. This may also include replacing a destination IP address 406B of VM1 Windows client with a loopback IP address 416B of VM3. The replacing process is described in detail in FIG. 4B. The resulting packet is referred to herein as a packet 410B.

Figure 4B:
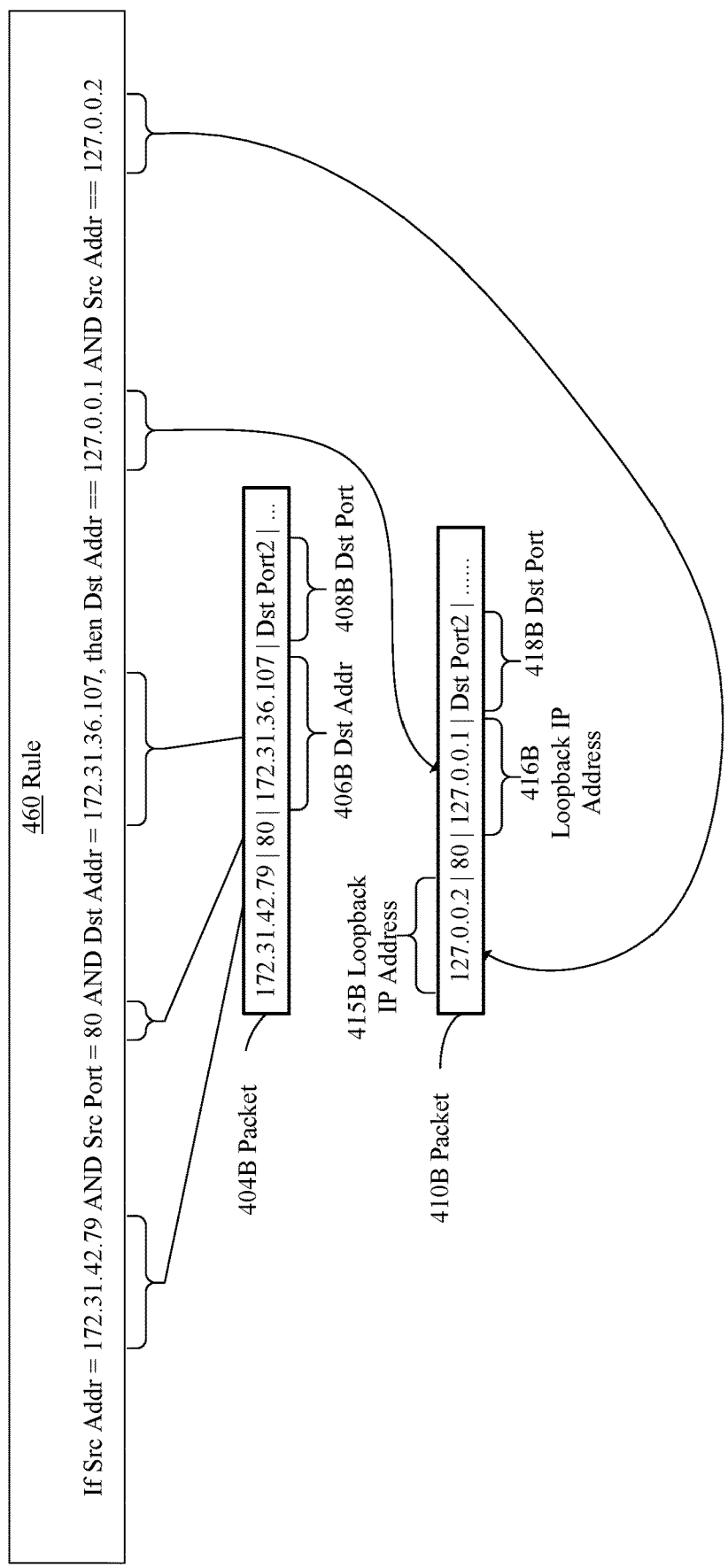
FIG. 4B is a block diagram depicting an example NAT translation performed by a NAT redirect agent.

FIG. 4B is a block diagram depicting an example NAT translation performed by NAT redirect agent 303B. The example NAT translation uses an example rule 460. Rule 460 describes that, in a header of data packet 404B, a source IP address of "172.31.42.79" is to be replaced with a loopback IP address 415B of "127.0.0.2," and a destination IP address 406B is to be replaced with a loopback IP address 416B of "127.0.0.1".

Continuing with the example described in FIG. 4A, DNE-TLS server agent 314B detects, on port "446" packet 410B, and DNE-TLS server agent 314B determines that packet 410B is a SYN/ACK packet. Therefore, DNE-TLS server agent 314B generates a SYN/ACK packet, and sends the SYN/ACK packet to DNE-TLS client agent 312A, which detects the packet on port "8090."

DNE-TLS client agent 312A determines that the detected packet is a SYN/ACK packet, and, therefore, generates a SYN/ACK packet 410A having a source IP address as an IP address of VM1 Windows client, and a destination IP address as the IP address of VM1 Windows client. The resulting packet is referred herein as a packet 410A.

In an embodiment, packet 410A is intercepted by NAT restore agent 305A, which restores packet 410A. To do so, NAT restore agent 305A may perform a NAT translation on the intercepted packet 410A, and cause redirecting the translated packet to client application 302A. For example, the NAT translation may be performed on a header of packet 410A by replacing, in the header, a source IP address of VM1 Windows client with an IP address of VM3 Windows server 1077B, and replacing a destination IP address of VM1 Windows client with an IP address of VM1 Windows client 1077A. The replacing process is described in detail in FIG. 4C. The resulting packet is referred to herein as a packet 404A.

Figure 4C:
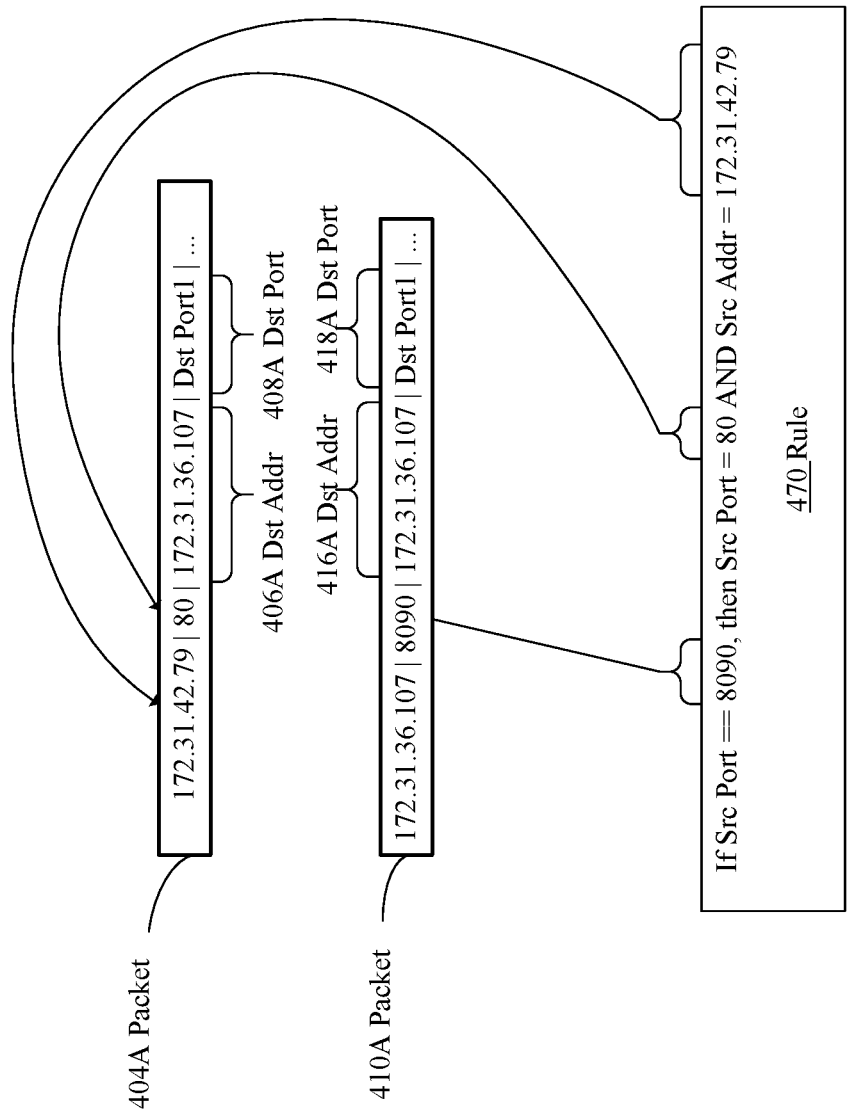
FIG. 4C is a block diagram depicting an example NAT translation performed by a NAT restore agent.

FIG. 4C is a block diagram depicting an example NAT translation performed by NAT restore agent 305A. The example NAT translation uses an example rule 470. Rule 470 describes that, in a header of data packet 410A, source IP address of "172.31.36.79" is to be replaced with the source IP address "172.31.36.107" of VM1 Windows client, and a destination IP address of "172.31.36.107" is to be replaced with the destination IP address of "172.31.42.107" of VM1 Windows client.

Resulting packet 404A is provided to client application 302A. Upon receiving data packet 404A, client application 302A may generate a response.

Once a secure TTT communications connection is established between DNE-TLS client agent 312A and DNE-TLS server agent 314B, client application 302A and server application 302B may securely exchange data packet between each other. The secure connection is transparent to both client application 302A and server application 302B, and both client application 302A and server application 302B benefit from the provided security mechanisms.

The described process imposes no requirements on either client application 302A or server application 302B to decrypt or encrypt data packets. The security mechanisms are provided by the agents implemented in the corresponding virtual machines, by utilizing loopback IP addresses and spare ports implemented in the virtual machines.

6. Example Flow Chart for Implementing an Address Redirect Translation

Figure 5A:
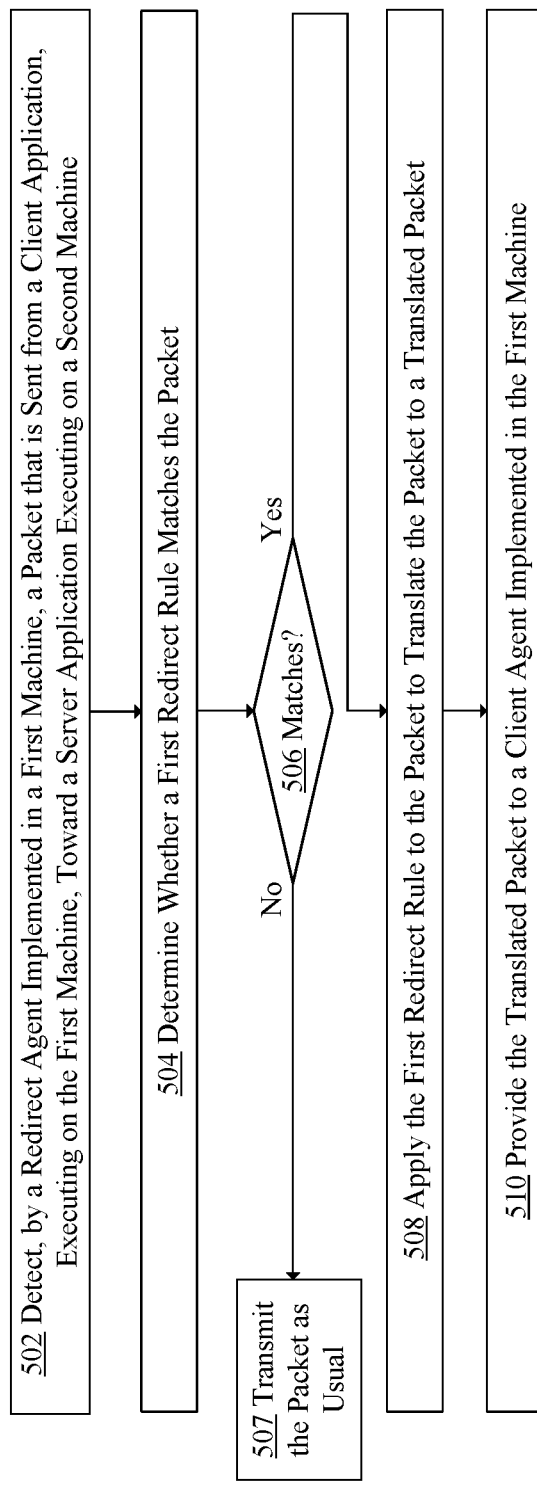
FIG. 5A is an example flow chart for implementing a NAT redirect translation.

FIG. 5A is an example flow chart for implementing an address redirect translation. In the example, it is assumed that a first machine corresponds to a VM1 client, and a second machine corresponds to a VM3 server. Furthermore, it is assumed that a redirect agent corresponds to a NAT redirect agent implemented in VM1, and a client agent corresponds to a DNE-TLS client agent implemented in VM1. Moreover, a server agent corresponds to a DNE-TLS server agent implemented in VM3.

In step 502, a redirect agent implemented in a first machine, detects a packet that is sent from a client application, executing on the first machine, toward a server application executing on a second machine.

In step 504, the redirect agent determines whether a first redirect rule matches the packet. In an embodiment, the first redirect rule corresponds to a NAT rule 360 depicted in FIG. 3B.

If, in step 506, the redirect agent determines that the first redirect rule matches the packet, then step 508 is performed. Otherwise, step 507 is performed, in which the packet is transmitted toward the server application without applying the address redirect translation.

In step 508, the redirect agent applies the first redirect rule to the packet to translate the packet into a translated packet. An example process of applying a redirect rule to a packet is described in FIG. 3B.

In step 510, the redirect agent provides the translated packet to a client agent implemented in the first machine to cause the client agent to transmit the translated packet to a server agent implemented in the second machine.

The flow chart depicted in FIG. 5A is described in detail in FIG. 3A.

7. Example Flow Chart for Implementing an Address Restore Translation

Figure 5B:
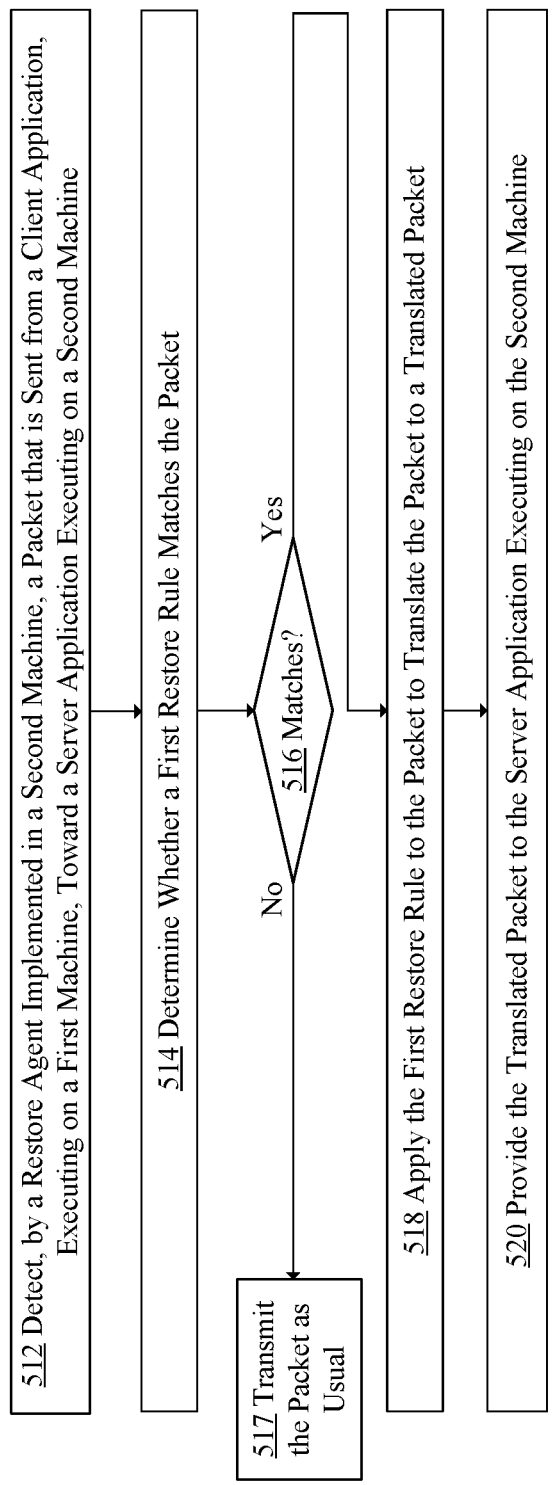
FIG. 5B is an example flow chart for implementing a NAT restore translation.

FIG. 5B is an example flow chart for implementing an address restore translation. In the example, it is assumed that a first machine corresponds to a VM1 client, and a second machine corresponds to a VM3 server. Furthermore, it is assumed that a restore agent corresponds to a NAT restore agent implemented in VM3, and a server agent corresponds to a DNE-TLS server agent implemented in VM3. Moreover, a client agent corresponds to a DNE-TLS client agent implemented in VM1.

In step 512, a restore agent implemented in a second machine, detects a packet that is sent from a client application, executing on a first machine, toward a server application executing on the second machine.

In step 514, the restore agent determines whether a first restore rule matches the packet.

If, in step 516, the restore agent determines that the first restore rule matches the packet, then step 518 is performed. Otherwise, step 517 is performed, in which the packet is transmitted toward the server application without applying the address restore translation.

In step 518, the restore agent applies the first restore rule to the packet to translate the packet into a translated packet. An example process of applying a restore rule to a packet is described in FIG. 3C.

In step 520, the restore agent provides the translated packet to a server agent implemented in the second machine to cause the server agent to transmit the translated packet to a client agent implemented in the first machine.

The flow chart depicted in FIG. 5B is described in detail in FIG. 4A.

8. Example Http-Based Implementation

To place TTT functionality in a cloud, a DNE-TLS agent may be deployed on each virtual machine that requires an encryption service. The DNE-TLS agent may have two functional components: a DNE-TLS-Client and a DNE-TLS-Server. The two components can coexist in the same DNE-TLS agent. A DNE-TLS-Client may receive a TCP connection request from an application client (i.e., App-Client), encrypt the request, and send the encrypted request to a DNE-TLS tunnel. On the other end of the tunnel, a DNE-TLS-Server terminates the tunnel and passes the decrypted traffic to an application server (i.e., App-Server).

In the following example, an example of HTTP connection is used to illustrate how DNE-TLS agents operate on the datapath between an App-Client and an App-Server, across two virtual machines, one of which is referred to as a client VM and another as a server VM.

The following notation is used in the example below:

C1: client VM IP address
S1: server VM IP address
L: server VM default lookback IP address (e.g., 127.0.0.1)
L1: another server VM loopback IP address (e.g., 127.0.0.2)
P1: a local port to which the HTTP connection is redirected. This port is also called a redirect port.
P1': a DNE-TLS tunnel port on which DNE-TLS-Server listens. This port is called a DNE-TLS tunnel port.

The pseudo-code below describes the steps that are performed on packets sent from a client application to a server application in a so-called forward direction:

1. App-Client initiates a TCP connection to server IP on HTTP port 80.
2. A DNAT filter is applied, which matches on S1 (server VM IP address) and port 80, to redirect the connection to C1 (client VM IP address) on port P1 by changing destination IP to C1 and port of the packets to P1. We call this NAT filter client-side traffic redirect filter (NAT1).
3. DNE-TLS-Client listens on local port P1, intercepts and terminates the original TCP connection (by proxying 3-way TCP handshakes) that carries HTTP request, and establishes a DNE-TLS connection (tunnel) from C1 towards S1 (server IP) on DNE-TLS tunnel port P1'. This is where DNE-TLS encryption happens. The HTTP traffic originated from the App-Client is forwarded by DNE-TLS-Client to DNE-TLS-Server in a TTT encrypted fashion.
4. DNE-TLS-Server listens on port P1', terminates the DNE-TLS connection originated from DNE-TLS-Client, and decrypts the traffic.

5. Once the connection is off DNE-TLS tunnel, DNE-TLS-Server initiates a final TCP connection (from default loopback address 127.0.0.1) towards L1 (127.0.0.2) on destination port 80.
6. In order for an application server to see the real client IP address, a second NAT filter (NAT2) is applied, which matches on L (source IP), L1 (destination IP) and destination port 80, to restore client IP address by changing L and L1 to C1 and S1. We call this NAT filter client IP restoration filter.
7. App-Server receives HTTP requests as if they come from App-Client directly.

It should be noted that steps 1-3 are performed at the client VM, and steps 4-7 are performed at the server VM. There are 3 TCP connections involved along the datapath. The first connection starts from App-Client, then is redirected to and terminated at DNE-TLS-Client. The second connection starts from DNE-TLS-Client and terminates at DNE-TLS-Server with the DNE-TLS encryption tunnel. The third connection starts from DNE-TLS-Server and terminates at App-Server with a Client IP restoration.

The pseudo-code below describes the steps that are performed on packets sent from a server application to a client application in a so-called backward direction:

1. App-Server responds to an HTTP request by sending a response from source IP (S1) and source port 80 to destination IP (C1) via the third TCP connection as described above.
2. In order for App-Server's response to get back through DNE-TLS tunnel, a third NAT filter is applied, which matches on C1 (destination IP), S1 (source IP), and source port 80, to redirect the response to DNE-TLS-Server by changing C1 (destination IP) and S1 (source IP) back to L and L1. This filter is referred to as a server-side traffic redirect filter (NAT3).
3. DNE-TLS-Server receives the response, encrypts it into DNE-TLS tunnel and sends it back to DNE-Client with source IP (S1) on source port P1' and destination IP (C1).
4. DNE-TLS-Client receives and decrypts DNE-TLS traffic over the second connection as described above.
5. The decrypted response is sent back to App-Client from C1 on source port P1 to C1 on destination port from which the HTTP connection request is originally sourced.
6. In order for App-Client to see the real server IP address, a fourth NAT filter (NAT4) is applied, which matches on port P1 (source port), to restore server IP by changing source IP C1 to S1. This filter is referred to as a server IP restoration filter.
7. App-Client receives HTTP response as if it comes from App-Server directly.

It should be noted that steps 1-3 are performed at the server VM and steps 4-7 are performed at the client VM. Along the forward and backward paths, there are 4 NAT filters applied, NAT1, NAT2, NAT3, and NAT4, as described above. NAT1 and NAT3 are used to redirect a connection request and a response to DNE-TLS-Client, and DNE-TLS-Server, respectively. NAT2 and NAT4 are used to restore the real client and server IP addresses, respectively. All above steps have been verified via real-world experimentation for proof of concept.

9. Example Full-Mesh Implementation

In an embodiment, a full-mesh routing capability is implemented across all VM clients and VM servers. A non-limiting example of the full-mesh routing capabilities is described in this section. The example illustrates a scenario in which three client virtual machines communicate with three server virtual machines using separate secure TTT tunnels. The scheme can be extended to any number of clients and servers in a straightforward fashion.

To enable full-mesh, DNE-TLS-tunnel communications, redirect ports, DNE-TLS tunnel ports, and server loopback IP addresses are allocated to facilitate routings from different clients to different servers.

The following notation is used in the example below:
C1: IP address of client VM 1
C2: IP address of client VM 2
C3: IP address of client VM 3
S1: IP address of server VM 1
S2: IP address of server VM 2
S3: IP address of server VM 3
L: server VM default lookback IP address (127.0.0.1)
L1: additional server VM loopback IP address 1 (say 127.0.0.2) allocated for traffic coming from client VM 1
L2: additional server VM loopback IP address 2 (say 127.0.0.3) allocated for traffic coming from client VM 2
L3: additional server VM loopback IP address 3 (say 127.0.0.4) allocated for traffic coming from client VM 3
P1: redirect port 1 allocated for traffic going to server VM 1
P2: redirect port 2 allocated for traffic going to server VM 2
P3: redirect port 3 allocated for traffic going to server VM 3
P1': DNE-TLS tunnel port 1 allocated for traffic coming from client VM 1
P2': DNE-TLS tunnel port 2 allocated for traffic coming from client VM 2
P3': DNE-TLS tunnel port 3 allocated for traffic coming from client VM 3.

To implement the full-mesh routing capabilities on a client side the following redirect ports (P1, P2, P3) are used to differentiate connections going to different servers. An example pseudo-code included below is for full-mesh TTT connections established between any client VM, of a plurality of client VMs, and any server VM, of a plurality of server VMs. It should be noted that the arrow below represents the connection initiation direction.

C1->S1: redirect App-Client traffic to C1:P1, DNE-TLS-Client listens on C1:P1 and creates DNE-TLS tunnel connection towards S1:P1'.
C1->S2: redirect App-Client traffic to C1:P2, DNE-TLS-Client listens on C1:P2 and creates DNE-TLS tunnel connection towards S2:P1'.
C1->S3: redirect App-Client traffic to C1:P3, DNE-TLS-Client listens on C1:P3 and creates DNE-TLS tunnel connection towards S3:P1'.
C2->S1: redirect App-Client traffic to C2:P1, DNE-TLS-Client listens on C2:P1 and creates DNE-TLS tunnel connection towards S1:P2'.
C2->S2: redirect App-Client traffic to C2:P2, DNE-TLS-Client listens on C2:P2 and creates DNE-TLS tunnel connection towards S2:P2'.
C2->S3: redirect App-Client traffic to C2:P3, DNE-TLS-Client listens on C2:P3 and creates DNE-TLS tunnel connection towards S3:P2'.
C3->S1: redirect App-Client traffic to C3:P1, DNE-TLS-Client listens on C3:P1 and creates DNE-TLS tunnel connection towards S1:P3'.
C3->S2: redirect App-Client traffic to C3:P2, DNE-TLS-Client listens on C3:P2 and creates DNE-TLS tunnel connection towards S2:P3'.

C3->S3: redirect App-Client traffic to C3:P3, DNE-TLS-Client listens on C3:P3 and creates DNE-TLS tunnel connection towards S3:P3'.

To implement the full-mesh routing capabilities on a server side the following DNE-TLS tunnel ports (P1', P2', P3') are used to differentiate connections coming from different clients. An example pseudo-code is included below:

C1->S1: DNE-TLS-Server listens on S1:P1', terminates DNE-TLS connection, creates a new TCP connection from L to L1. Apply NAT to restore client IP back to C1.
C2->S1: DNE-TLS-Server listens on S1:P2', terminates DNE-TLS connection, creates a new TCP connection from L to L2. Apply NAT to restore client IP back to C2.
C3->S1: DNE-TLS-Server listens on S1:P3', terminates DNE-TLS connection, creates a new TCP connection from L to L3. Apply NAT to restore client IP back to C3.
C1->S2: DNE-TLS-Server listens on S2:P1', terminates DNE-TLS connection, creates a new TCP connection from L to L1. Apply NAT to restore client IP back to C1.
C2->S2: DNE-TLS-Server listens on S2:P2', terminates DNE-TLS connection, creates a new TCP connection from L to L2. Apply NAT to restore client IP back to C2.
C3->S2: DNE-TLS-Server listens on S2:P3', terminates DNE-TLS connection, creates a new TCP connection from L to L3. Apply NAT to restore client IP back to C3.
C1->S3: DNE-TLS-Server listens on S3:P1', terminates DNE-TLS connection, creates a new TCP connection from L to L1. Apply NAT to restore client IP back to C1.
C2->S3: DNE-TLS-Server listens on S3:P2', terminates DNE-TLS connection, creates a new TCP connection from L to L2. Apply NAT to restore client IP back to C2.
C3->S3: DNE-TLS-Server listens on S3:P3', terminates DNE-TLS connection, creates a new TCP connection from L to L3. Apply NAT to restore client IP back to C3.

10. Improvements Provided by Certain Embodiments

In an embodiment, an approach provides security mechanisms for exchanging communications between client applications and server applications executing under various operating systems, including the Windows operating system. In the Windows-based implementation, a DNE-TLS client agent executing on one virtual machine establishes a secure TTT communications connection with a DNE-TLS server agent executing on another virtual machine. The secure TTT connection is used by the client application and the server application to securely communicate with each other across two virtual machines without imposing any encryption requirements on the client application and the server applications.

11. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus, and used for storing information and software instructions to be executed by a processor. Main memory may also be used for storing temporary variables or other intermediate information during execution of software instructions to be executed by one or more processors.

12. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method for a virtual machine to use a port and loopback IP addresses allocation scheme for full-mesh communications with transparent transport layer security tunnels, the method comprising:
   detecting, at a redirect agent implemented in a first machine, a packet that is sent from a client application, executing on the first machine, toward a server application executing on a second machine;
   determining, by the redirect agent, whether a first redirect rule matches the packet;
   wherein the first redirect rule specifies modifications to a header of the packet to cause redirecting the packet toward a secure tunnel between the first machine and the second machine;
   in response to determining that the first redirect rule matches the packet, applying, by the redirect agent, the first redirect rule to the packet to translate the packet into a translated packet by at least replacing, in the translated packet, a destination port identifier of a port implemented on the second machine with an identifier of a redirect port implemented on the first machine and replacing a source IP address with a loopback IP address of the first machine; and
   providing the translated packet to a client agent implemented in the first machine, the client agent configured to encrypt the translated packet and transmit the encrypted translated packet over the secure tunnel to a server agent implemented in the second machine.

2. The method of claim 1, wherein, upon detecting the translated packet, the client agent implemented in the first machine:
   determines whether the translated packet is a request to establish a communications connection between the client application executing on the first machine and the server application executing on the second machine;
   in response to determining that the translated packet is the request to establish the communications connection between the client application and the server application:
      establishes a secure communications connection between the client agent implemented in the first machine and the server agent implemented in the second machine;
      establishes a first communications connection between the client application executing on the first machine and the client agent implemented in the first machine; and
      causes establishing a second communications connection between the server agent implemented in the second machine and the server application executing on the second machine.

3. The method of claim 2, wherein the establishing the secure communications connection between the client agent implemented in the first machine and the server agent implemented in the second machine comprises generating encryption keys and communicating the encryption keys to the client agent and the server agent to be used by the client agent and the server agent to encrypt and decrypt data packets exchanged between the client agent and the server agent.

4. The method of claim 3, wherein, upon detecting the translated packet, the client agent implemented in the first machine:
   determines whether the translated packet is a data packet;
   in response to determining that the translated packet is the data packet:
      encrypts the translated packet using the encryption keys to generate an encrypted data packet; and
      transmits the encrypted data packet to the server agent implemented in the second machine.

5. The method of claim 4, wherein, upon detecting the encrypted data packet, the server agent implemented in the second machine: decrypts the encrypted data packet using the encryption keys to generate a decrypted data packet, and provides the decrypted data packet to a restore agent implemented in the second machine; and
   wherein, upon detecting the decrypted data packet, the restore agent implemented in the second machine:
      determines whether a first restore rule matches the decrypted data packet; and
      in response to determining that the first restore rule matches the decrypted data packet, the restore agent applies the first restore rule to the decrypted data packet to translate the decrypted data packet into a restored data packet, and provides the restored data packet to the server application executing on the second machine.

6. The method of claim 5, wherein, upon detecting a response data packet that is sent from the server application executing on the second machine toward the client application executing on the first machine, a redirect agent executing on the second machine:
   determines whether a second redirect rule matches the response data packet;
   in response to determining that the second redirect rule matches the response data packet:
      applies the second redirect rule to the response data packet to translate the response data packet into a translated response data packet; and
      provides the translated response data packet to the server agent implemented in the second machine to cause the server agent to encrypt the translated response data packet using the encryption keys to generate an encrypted response data packet, and transmit the encrypted response data packet to the client agent implemented in the first machine.

7. The method of claim 6, wherein, upon detecting the encrypted response data packet, the client agent implemented in the first machine:
   decrypts the encrypted response data packet using the encryption keys to generate a decrypted response data packet; and
   provides the decrypted response data packet to a restore agent implemented in the first machine; and
   wherein, upon detecting the decrypted response data packet, the restore agent implemented in the first machine:
      determines whether a second restore rule matches the decrypted response data packet; and
      in response to determining that the second restore rule matches the decrypted response data packet, the restore agent applies the second restore rule to the decrypted response data packet to translate the decrypted response data packet into a restored response data packet, and provides the restored response data packet to the client application executing on the first machine.

8. One or more non-transitory computer-readable storage media storing one or more computer instructions which, when executed by one or more processors, cause the one or more processors to use a port and loopback IP addresses allocation scheme for full-mesh communications with transparent transport layer security tunnels, and to perform:

detecting, at a redirect agent implemented in a first machine, a packet that is sent from a client application, executing on the first machine, toward a server application executing on a second machine;

determining, by the redirect agent, whether a first redirect rule matches the packet;

wherein the first redirect rule specifies modifications to a header of the packet to cause redirecting the packet toward a secure tunnel between the first machine and the second machine;

in response to determining that the first redirect rule matches the packet, applying, by the redirect agent, the first redirect rule to the packet to translate the packet into a translated packet by at least replacing, in the translated packet, a destination port identifier of a port implemented on the second machine with an identifier of a redirect port implemented on the first machine and replacing a source IP address with a loopback IP address of the first machine; and providing the translated packet to a client agent implemented in the first machine, the client agent configured to encrypt the translated packet and transmit the encrypted translated packet over the secure tunnel to a server agent implemented in the second machine.

9. The one or more non-transitory computer-readable storage media of claim 8, wherein, upon detecting the translated packet, the client agent implemented in the first machine:

determines whether the translated packet is a request to establish a communications connection between the client application executing on the first machine and the server application executing on the second machine;

in response to determining that the translated packet is the request to establish the communications connection between the client application and the server application:

establishes a secure communications connection between the client agent implemented in the first machine and the server agent implemented in the second machine;

establishes a first communications connection between the client application executing on the first machine and the client agent implemented in the first machine; and causes establishing a second communications connection between the server agent implemented in the second machine and the server application executing on the second machine.

10. The one or more non-transitory computer-readable storage media of claim 9, wherein the establishing the secure communications connection between the client agent implemented in the first machine and the server agent implemented in the second machine comprises generating encryption keys and communicating the encryption keys to the client agent and the server agent to be used by the client agent and the server agent to encrypt and decrypt data packets exchanged between the client agent and the server agent.

11. The one or more non-transitory computer-readable storage media of claim 10, wherein, upon detecting the translated packet, the client agent implemented in the first machine:

determines whether the translated packet is a data packet;

in response to determining that the translated packet is the data packet:

encrypts the translated packet using the encryption keys to generate an encrypted data packet; and transmits the encrypted data packet to the server agent implemented in the second machine.

12. The one or more non-transitory computer-readable storage media of claim 11, wherein, upon detecting the encrypted data packet, the server agent implemented in the second machine: decrypts the encrypted data packet using the encryption keys to generate a decrypted data packet, and provides the decrypted data packet to a restore agent implemented in the second machine; and wherein, upon detecting the decrypted data packet, the restore agent implemented in the second machine:

determines whether a first restore rule matches the decrypted data packet; and in response to determining that the first restore rule matches the decrypted data packet, the restore agent applies the first restore rule to the decrypted data packet to translate the decrypted data packet into a restored data packet, and provides the restored data packet to the server application executing on the second machine.

13. The one or more non-transitory computer-readable storage media of claim 12, wherein, upon detecting a response data packet that is sent from the server application executing on the second machine toward the client application executing on the first machine, a redirect agent executing on the second machine:

determines whether a second redirect rule matches the response data packet;

in response to determining that the second redirect rule matches the response data packet:

applies the second redirect rule to the response data packet to translate the response data packet into a translated response data packet; and provides the translated response data packet to the server agent implemented in the second machine to cause the server agent to encrypt the translated response data packet using the encryption keys to generate an encrypted response data packet, and transmit the encrypted response data packet to the client agent implemented in the first machine.

14. The one or more non-transitory computer-readable storage media of claim 13, wherein, upon detecting the encrypted response data packet, the client agent implemented in the first machine:

decrypts the encrypted response data packet using the encryption keys to generate a decrypted response data packet; and provides the decrypted response data packet to a restore agent implemented in the first machine; and wherein, upon detecting the decrypted response data packet, the restore agent implemented in the first machine:

determines whether a second restore rule matches the decrypted response data packet; and in response to determining that the second restore rule matches the decrypted response data packet, the restore agent applies the second restore rule to the decrypted response data packet to translate the decrypted response data packet into a restored response data packet, and provides the restored response data packet to the client application executing on the first machine.

15. A virtual machine implemented in a host computer and configured to use a port and loopback IP addresses allocation scheme for full-mesh communications with transparent transport layer security tunnels, the virtual machine comprising:
one or more processors;
one or more memory units; and
one or more non-transitory computer-readable storage media storing one or more computer instructions which, when executed by the one or more processors, cause the one or more processors to perform:
detecting, at a redirect agent implemented in a first machine, a packet that is sent from a client application, executing on the first machine, toward a server application executing on a second machine;
determining, by the redirect agent, whether a first redirect rule matches the packet;
wherein the first redirect rule specifies modifications to a header of the packet to cause redirecting the packet toward a secure tunnel between the first machine and the second machine;
in response to determining that the first redirect rule matches the packet, applying, by the redirect agent, the first redirect rule to the packet to translate the packet into a translated packet by at least replacing, in the translated packet, a destination port identifier of a port implemented on the second machine with an identifier of a redirect port implemented on the first machine and replacing a source IP address with a loopback IP address of the first machine; and
providing the translated packet to a client agent implemented in the first machine, the client agent configured to encrypt the translated packet and to transmit the encrypted translated packet over the secure tunnel to a server agent implemented in the second machine.

16. The virtual machine of claim 15, wherein, upon detecting the translated packet, the client agent implemented in the first machine:
determines whether the translated packet is a request to establish a communications connection between the client application executing on the first machine and the server application executing on the second machine;
in response to determining that the translated packet is the request to establish the communications connection between the client application and the server application:
establishes a secure communications connection between the client agent implemented in the first machine and the server agent implemented in the second machine;
establishes a first communications connection between the client application executing on the first machine and the client agent implemented in the first machine; and
causes establishing a second communications connection between the server agent implemented in the second machine and the server application executing on the second machine.

17. The virtual machine of claim 16, wherein the establishing the secure communications connection between the client agent implemented in the first machine and the server agent implemented in the second machine comprises generating encryption keys and communicating the encryption keys to the client agent and the server agent to be used by the client agent and the server agent to encrypt and decrypt data packets exchanged between the client agent and the server agent.

18. The virtual machine of claim 17, wherein, upon detecting the translated packet, the client agent implemented in the first machine:
determines whether the translated packet is a data packet;
in response to determining that the translated packet is the data packet:
encrypts the translated packet using the encryption keys to generate an encrypted data packet; and
transmits the encrypted data packet to the server agent implemented in the second machine.

19. The virtual machine of claim 18, wherein, upon detecting the encrypted data packet, the server agent implemented in the second machine: decrypts the encrypted data packet using the encryption keys to generate a decrypted data packet, and provides the decrypted data packet to a restore agent implemented in the second machine; and
wherein, upon detecting the decrypted data packet, the restore agent implemented in the second machine:
determines whether a first restore rule matches the decrypted data packet; and
in response to determining that the first restore rule matches the decrypted data packet, the restore agent applies the first restore rule to the decrypted data packet to translate the decrypted data packet into a restored data packet, and provides the restored data packet to the server application executing on the second machine.

20. The virtual machine of claim 15, wherein the secure tunnel is transparent to the client application and the server application.

* * * * *